United States Patent [19]

Slazas

[11] Patent Number: 4,621,699
[45] Date of Patent: * Nov. 11, 1986

[54] POWER TAKEOFF FOR TRACTOR HAVING PARALLELOGRAM FRONT WHEEL SUSPENSION

[75] Inventor: John J. Slazas, Cedarburg, Wis.

[73] Assignee: Simplicity Manufacturing, Inc., Port Washington, Wis.

[*] Notice: The portion of the term of this patent subsequent to Nov. 22, 2000 has been disclaimed.

[21] Appl. No.: 642,337

[22] Filed: Aug. 20, 1984

[51] Int. Cl.⁴ ............................................. B60K 25/02
[52] U.S. Cl. .............................. 180/53.7; 56/DIG. 22
[58] Field of Search ............................. 180/53.1, 53.7; 280/112 A; 56/15.8, DIG. 22

[56] References Cited

U.S. PATENT DOCUMENTS 4,416,109  11/1983  Slazas ................................ 280/112 A

FOREIGN PATENT DOCUMENTS 902170  7/1962  United Kingdom ............... 180/53.7

Primary Examiner—John J. Love
Assistant Examiner—Ross Weaver
Attorney, Agent, or Firm—James E. Nilles

[57] ABSTRACT

In a riding lawn tractor having a parallelogram front wheel suspension, a rigid support member on the tractor frame is of inverted U-shaped cross-section, with downwardly projecting front and rear walls, and the wheel brackets are pivoted to its opposite ends. A tubular bushing has one end portion received in a closely fitting hole in one of those walls; a flange secured to the bushing near its other end flatwise overlies the other wall and is bolted to it. A power takeoff shaft is rotatably housed in the bushing and has end portions that project forwardly and rearwardly beyond it for connection to a front-mounted implement and an underslung mower, one of those end portions also supporting a pulley for a belt connection between the shaft and the tractor engine. The bushing also serves as a trunnion for a tiltable mower hitch support.

4 Claims, 6 Drawing Figures

POWER TAKEOFF FOR TRACTOR HAVING PARALLELOGRAM FRONT WHEEL SUSPENSION

FIELD OF THE INVENTION

This invention relates to power takeoffs for riding-type garden tractors and is more particularly concerned with a power takeoff for a tractor having a parallelogram linkage front wheel support and a hitch support for an underslung rotary mower that tilts with tilting of the front tractor wheels, said power takeoff being connectable with a front-mounted implement as well as with the mower and being capable of transmitting enough power for a substantially large mower.

BACKGROUND OF THE INVENTION

U.S. Pat. No. 4,071,259, to D. A. Ernest, discloses a parallelogram linkage support for the front wheels of a tractor or the like whereby either of those wheels can rise relative to the other as the vehicle moves over irregular terrain, so that all four wheels maintain ground contact to afford good steering control. The advantage of the arrangement is that the center about which the front wheels effectively swing up and down is at a relatively high elevation, to be above the center of gravity of the vehicle and thus provide excellent vehicle stability.

U.S. Pat. No. 4,416,109, to J. J. Slazas, discloses a mower hitch support for a tractor having a parallelogram linkage front wheel suspension of the type disclosed in the Ernest patent, whereby an underslung mower is caused to tilt laterally in general conformity to tilting of the front tractor wheels, to thereby avoid scalping of the lawn. In this Slazas patent, the power transmitting connection between the mower and an engine that is conventionally mounted on the front part of the tractor frame is disclosed only as comprising pulleys on the top of the mower housing, connected with the mower blade spindles and intended to be driven by a V-belt. The mower obviously had to be driven from a power takeoff that was wholly disposed behind the parallelogram linkage, and there was no provision for powering a front-mounted implement such as a snowblower.

As will be apparent from a glance at the drawings in the Slazas patent, a parallelogram linkage front wheel suspension with a tiltable mower hitch extends both laterally and vertically across a substantial area at the front of the tractor. To transmit power by means of belts from behind that suspension to in front of it—or vice versa—would involve a complicated arangement of pulleys. Futhermore, a belt transmission arranged to provide one or more changes of direction of power transmission, as where there are both horizontally extending and vertically extending belt stretches, is not satisfactory in cases where two or more belts must be used to accommodate high horsepower requirements.

SUMMARY OF THE INVENTION

The general object of this invention is to provide a power takeoff arrangement for a riding-type garden tractor having a parallelogram linkage front wheel support and having a tiltable hitch support for an underslung mower that rides between the front and rear wheels of the tractor, said power takeoff providing for the transmission of substantially high horsepower through the area of the parallelogram linkage, as from an engine crankshaft connection in front of the linkage to a large mower behind it, and also providing for a convenient driving connection to an implement mounted on the front of the tractor.

It is also a general object of this invention to provide a power takeoff for a tractor having a front wheel suspension and mower hitch support of the character described, wherein a bushing rigidly fixed to the tractor frame houses a rotatable power takeoff shaft that projects both forwardly and rearwardly beyond the wheel suspension structure, and wherein that bushing also serves as a trunnion on which the mower hitch support is pivoted for its tilting motion.

Another and more specific object of the invention is to provide a power takeoff arrangement which achieves the above stated objectives and wherein said bushing, although very rigidly and securely connected with the tractor frame when installed, is readily removable and replaceable to facilitate assembly and disassembly of the power takeoff shaft and its bearings, which are housed in that bushing.

These and other objects of the invention that will appear as the description proceeds are achieved in a tractor having a rigid frame under which a mower can be carried longitudinally intermediate rear driving wheels and steerable front wheels, and which tractor comprises an engine mounted on a front portion of said frame, a rigid laterally extending support member near the front end of the frame, laterally opposite wheel supporting brackets, one pivoted to each end portion of said support member to swing about a longitudinally extending upper axis, a laterally extending link connected between said brackets and pivoted to each of them on a lower axis that is below and parallel to said upper axis to cooperate with the support member in connecting the brackets in a parallelogram linkage, and an axle member for each bracket having a laterally inner portion pivoted to the bracket to swing about a substantially vertical axis and having a laterally outwardly extending axle portion on which a front wheel is rotatable. The tractor of this invention is characterized by a tubular bushing secured to the support member intermediate the ends thereof with its axis extending longitudinally. A power takeoff shaft, coaxially rotatable in the bushing, has opposite end portions that respectively project forward and rearward beyond the bushing, and there is a driving connection between the engine and one of those end portions. A mower is hitched to a laterally extending hitch support having means near its opposite ends for detachable connection of forwardly projecting hitch members of the mower. A sleeve secured to the hitch support intermediate its ends surrounds the bushing to pivot the hitch support for rocking about the axis of the bushing. There is a connection between the hitch support and the link whereby substantially lateral motion of the link imparts rocking motion to the hitch support.

Preferably the support member is of inverted U-shaped cross-section to have downwardly projecting front and rear walls, and the hitch support is disposed between those front and rear walls. One of those walls has an aperture in which one end portion of the bushing is received with a close axially slideable fit; and a flange secured to the bushing near its other end, having surfaces normal to the axis of the bushing, is secured in flatwise overlying relationship to the other of the walls of the support member to fix the bushing to the support member.

BRIEF DESCRIPTION OF THE DRAWINGS

In the accompanying drawings, which illustrate what is now regarded as a preferred embodiment of the invention.

DETAILED DESCRIPTION OF THE PREFERRED EMBODIMENT OF THE INVENTION

Figure 1:
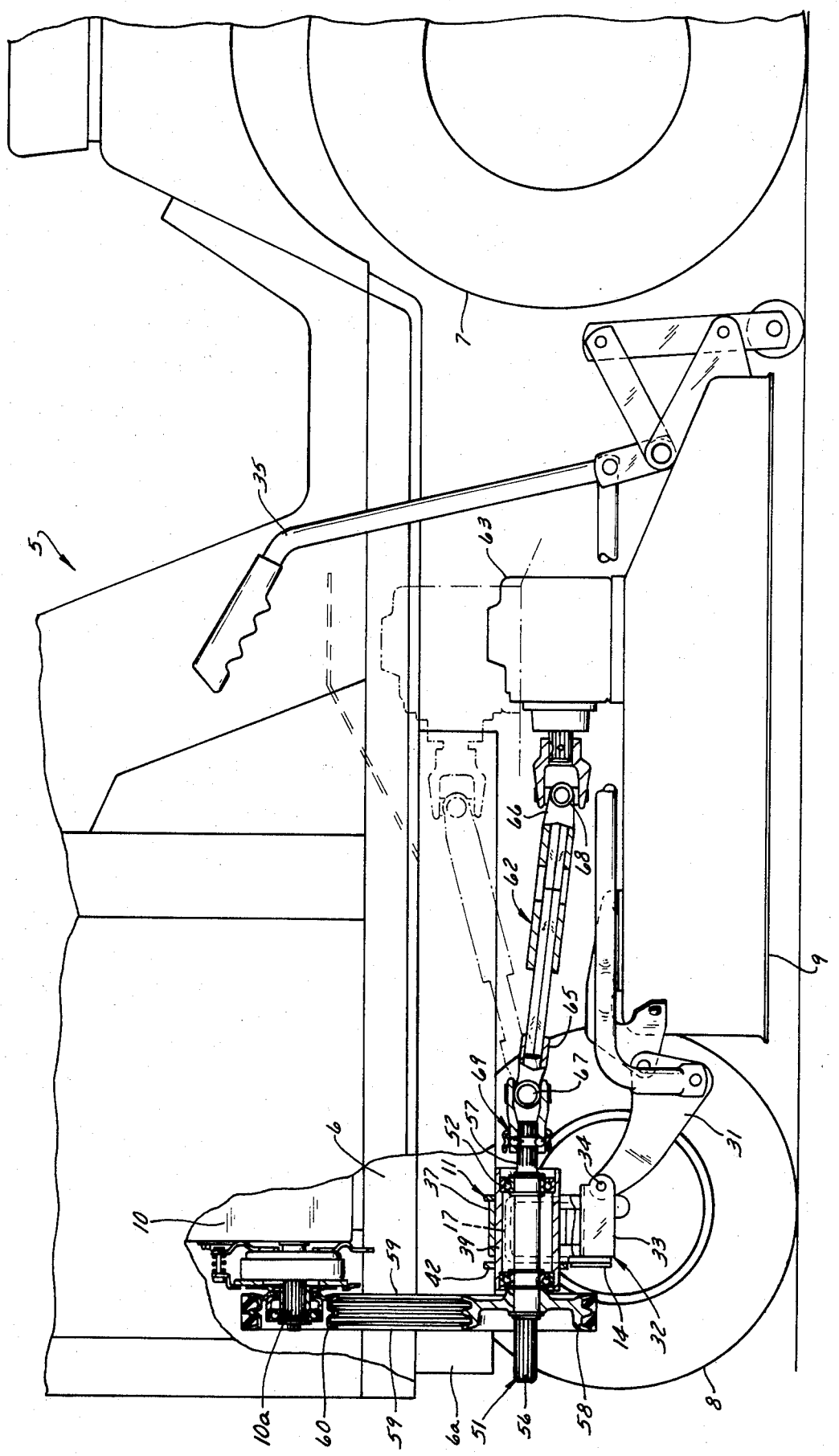
FIG. 1 is a view mainly in side elevation but partially in vertical section of a tractor which embodies the principles of this invention and to which an underslung mower is hitched.

A tractor 5 that embodies the principles of this invention has a rigid frame 6 which is supported on rear driving wheels 7 and steerable front wheels 8. Such a tractor is of the type usually referred to as a garden tractor, as distinguished from a larger and more powerful farm tractor, and is often used with a rotary lawn mower 9 which is hitched to underlie the frame 6 between the front wheels 8 and the rear wheels 7. Although the invention is by no means limited to use with relatively large mowers, it has particular advantage in relation to such implements and therefore the mower 9 that is here illustrated can be assumed to be relatively large, having a width on the order of 60 inches (1.5 m) and having three cutter blades (not shown) that rotate on laterally spaced vertical axes and are driven through a gearbox 63 that is mounted on top of the mower housing. It will be understood that the tractor 5 is also intended for use with other implements, particularly including front-mounted implements such as a snowblower (not shown).

As is conventional, an engine 10 is mounted on a front portion of the tractor frame 6 to provide power for driving the rear wheels 7 and—through a power takeoff shaft described hereinafter—for driving implements that may be hitched to the tractor. In this case the engine 10 has a horizontally extending crankshaft 10a. A transmission (not shown) through which the rear wheels 7 are driven is preferably connected with a rear end portion of the engine crankshaft 10a in a known manner, to be independent of the implement drive, which is connected with the front end portion of the crankshaft as described below.

The steerable front wheels 8 of the tractor 5 are mounted to the frame 6 in such a manner as to enable both of them to remain in contact with the ground as the tractor moves over substantial irregularities, for good steering control. To this end the front wheels are connected with the frame 6 in a parallelogram linkage which is of the general type disclosed in the above mentioned Ernest U.S. Pat. Nos. 4,071,259 and Slazas 4,416,259 and which comprises a laterally extending support member 11 that is rigidly affixed to the underside of the frame 6 near the front end thereof, a pair of wheel brackets 12 that are pivotally connected to opposite ends of the support member 11, and a link 14 that extends between the two wheel brackets 12 and has pivotal connections with them.

Figure 6:
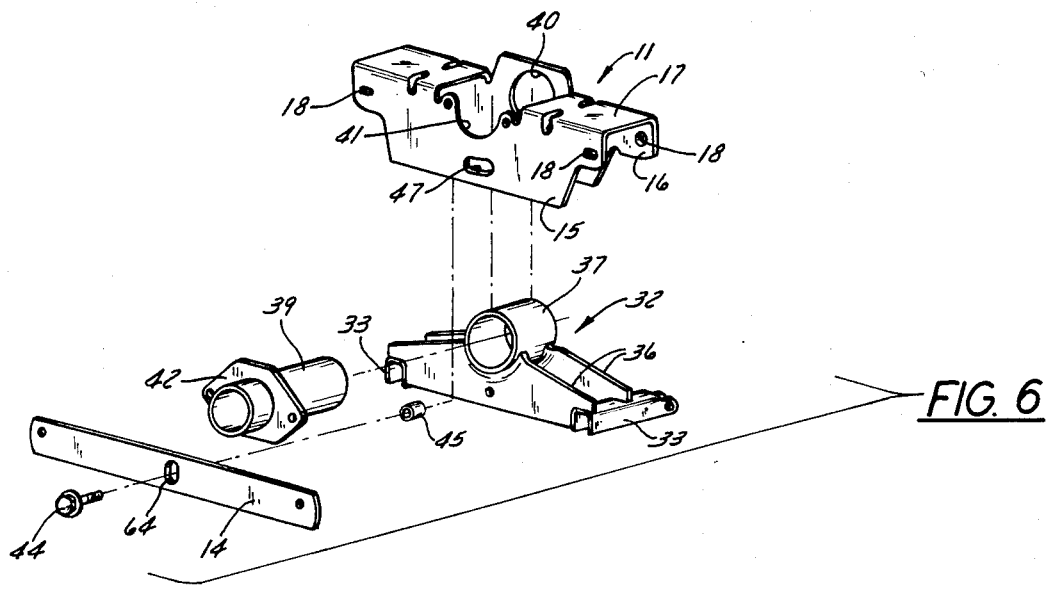
FIG. 6 is a disassembled perspective view of the support member, hitch support, bushing and link.
Figure 5:
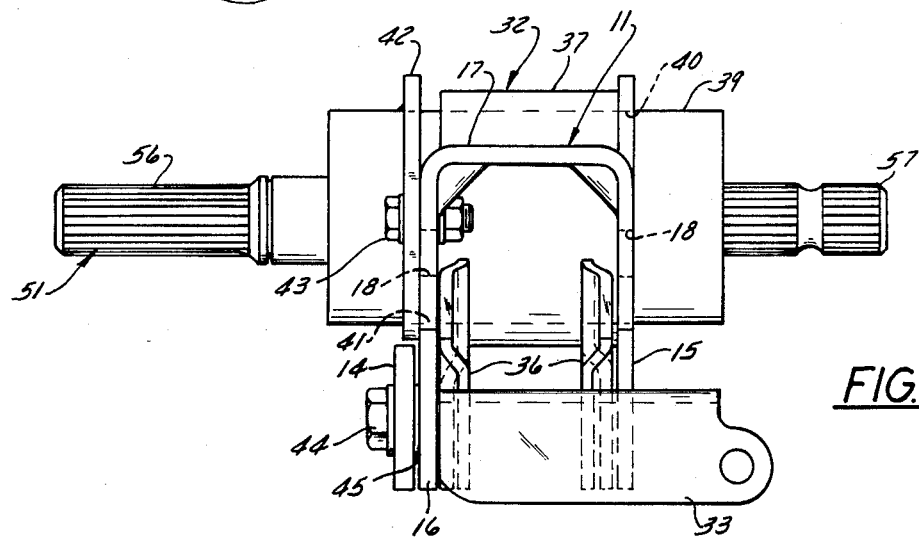
FIGS. 4 and 5 are fragmentary views in vertical section, on an enlarged scale, respectively taken on the planes of the lines 4—4 and 5—5 in FIG. 2.
Figure 4:
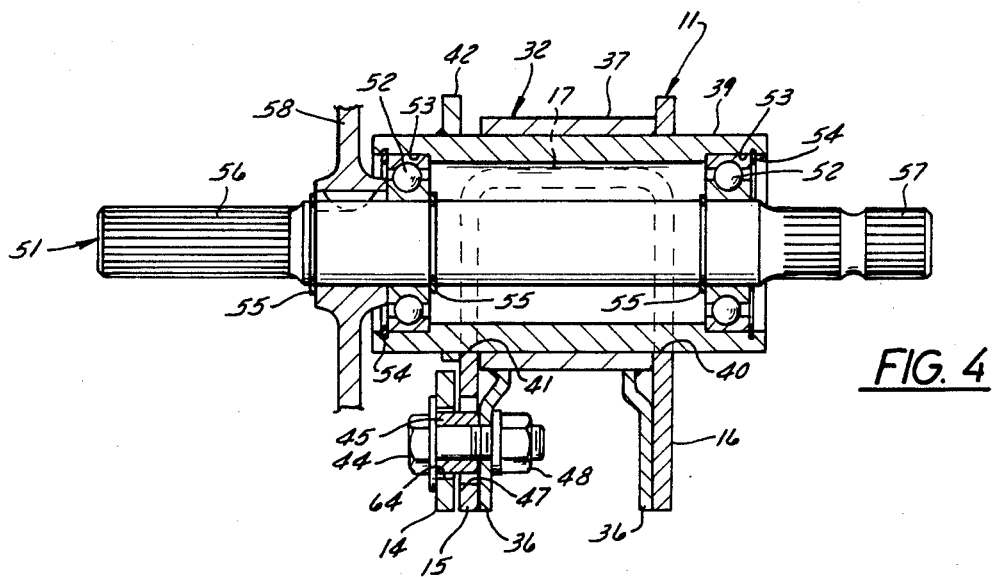

The support member 11, as best seen in FIG. 6, is of inverted U-shaped cross-section, having downwardly projecting front and rear wall portions 15 and 16, respectively, which are connected by a flat, horizontally extending upper web portion 17 that is secured, as by welding, to the undersides of laterally spaced, longitudinally extending frame members 6a, in bridging relation to them. It will be apparent that the support member 11 can be readily made in one piece and that, as connected with the longitudinal members 6a, it comprises a part of the rigid frame 6 of the tractor. Near each end of the support member its front and rear walls have coaxial holes 18 which accommodate pintles 19 by which the respective wheel brackets 12 are swingably connected to the support member.

Each of the wheel brackets 12 has upper and lower laterally inwardly projecting arms 21 and 22 respectively that are connected at their laterally outer ends by a substantially vertically extending sleeve portion 23. Through the upper arm 21 of each wheel bracket, near its laterally inner end, extends one of the pintles 19 that also extends through the coaxial holes 18 in the support member. Each wheel bracket is thus connected with the support member, between the wall portions 15 and 16 thereof, for swinging about a longitudinally extending pivot axis defined by the pintle 19.

Figure 2:
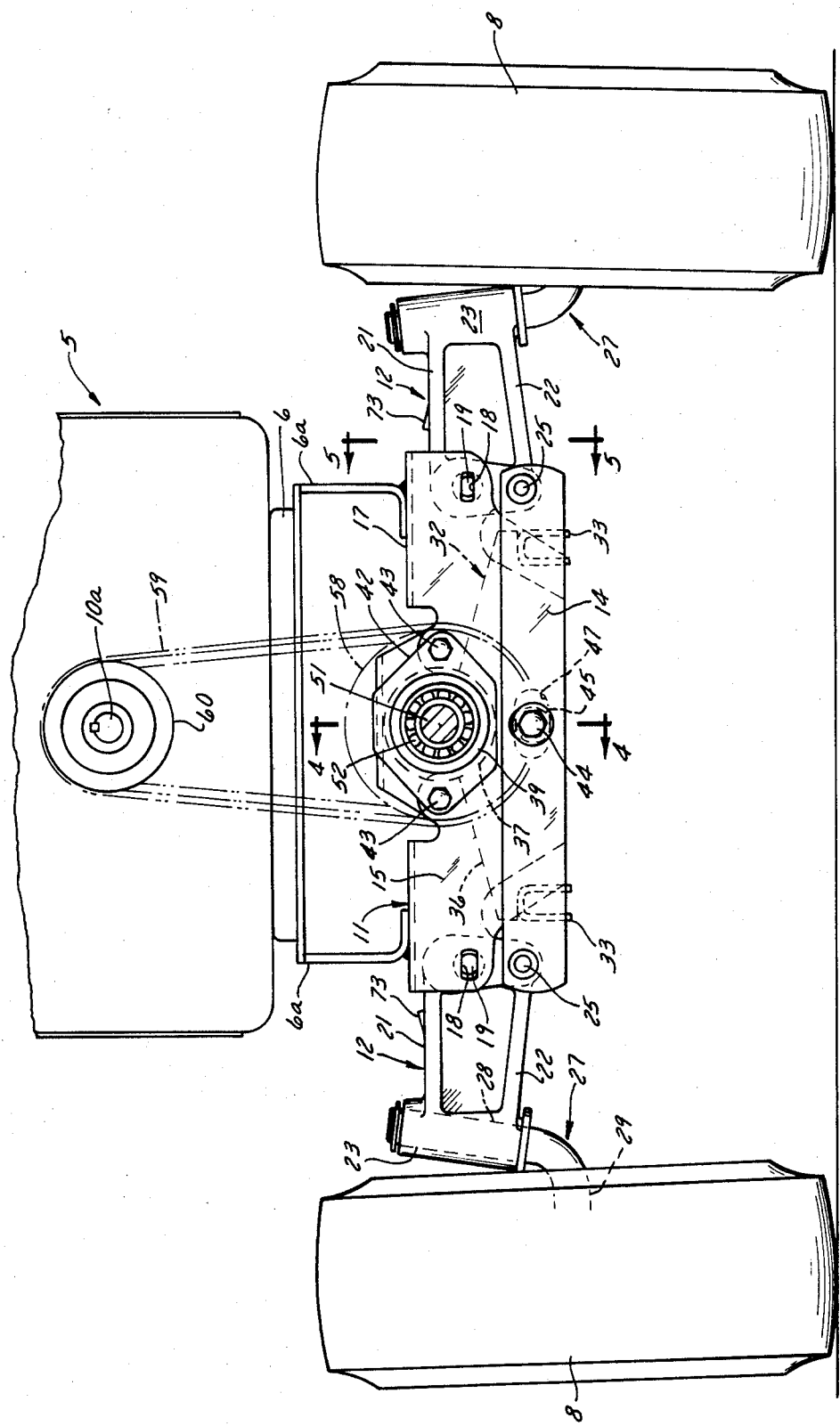
FIG. 2 is a view of the tractor in front elevation.

Through the laterally inner end of the lower arm 22 of each wheel bracket extends another pintle 25 which connects the wheel bracket with its adjacent end of the transversely extending link 14 and which defines a lower longitudinally extending pivot axis. As can be seen from FIGS. 2 and 3, the four longitudinally extending pivot axes that are defined by the respective pintles 19 and 25 are at the four corners of a parallelogram and are so arranged that the link 14 moves endwise from side to side of the tractor with up and down swinging of the brackets 12 about the upper axes defined by the pintles 19. It will also be apparent that when either wheel bracket 12 swings upward about its pintle 19, the link 14 constrains the other wheel bracket to a corresponding downward movement, and vice versa. To limit such swinging of the wheel brackets, each preferably has an abutment pad 73 formed at the top of its upper arm 21 that engages the end edge of the web portion 17 of the support member 11 when the wheel bracket swings up to a predetermined extent.

For each of the front wheels 8 there is a substantially L-shaped axle member 27, having a substantially upright leg 28 which is confined to swiveling in a bore in the sleeve portion 23 of the wheel bracket 12 and having a laterally outwardly projecting axle leg 29 on which a front wheel 8 is rotatable. Although the wheel steering linkage is not shown (it is generally conventional) it will be apparent that the upright legs 28 of the axle members, in their swiveling connections with the wheel brackets, provide for steering of the front wheels.

Figure 3:
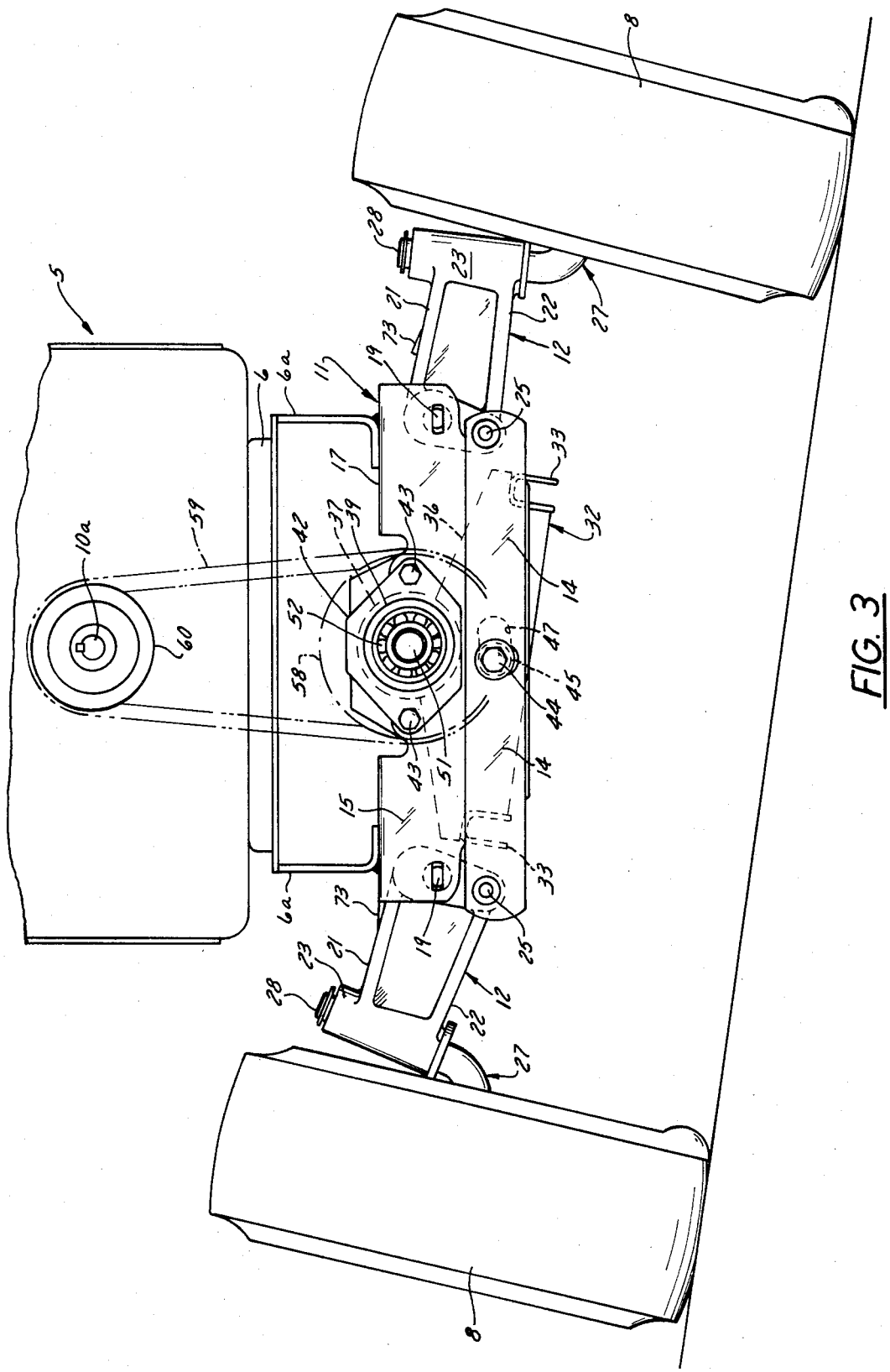
FIG. 3 is a view generally similar to FIG. 2, but showing the front wheels of the tractor on uneven ground.

When the front wheels 8 of the tractor encounter ground that tilts them relative to the rear wheels 7—the condition illustrated in FIG. 3—it is desirable that the mower 9 be laterally tilted in substantial correspondence with the tilting of the front wheels, in order to avoid scalping. The laterally spaced forwardly projecting hitching connection legs 31 that are conventionally present on the mower 9 are therefore connectable at their front ends to the opposite end portions of a laterally extending hitch support 32 which is medially pivoted to tilt about a longitudinally extending axis and which has a connection with the link 14 whereby its tilting is controlled, all as explained hereinafter.

Secured to the underside of the hitch support 32 near each end of it is a short longitudinally extending U-channel 33 which has downwardly projecting flanges and which comprises a hitch bracket. Each of the hitching connection legs 31 on the mower is receivable between the downwardly projecting flanges of a hitch bracket 33 and is detachably connectable to the hitch bracket by means of a hitch pin 34 that extends through aligned holes in the flanges and the hitching connection legs. The hitch pins 34 define a laterally extending axis about which rear end portions of the hitching connection legs 31 are swingable up and down to provide for raising and lowering adjustment of the mower 9. The mechanism for mower height adjustment, which comprises a manually actuatable lever 35, is not illustrated in detail inasmuch as it is fully disclosed in the above mentioned Slazas patent.

The hitch support 32, as best seen in FIG. 6, preferably comprises two flat plates 36 which are connected with one another in parallel edgewise upright relationship by their mutual connections (as by weldments) to the U-channel hitch brackets 33. Intermediate its ends each of these plates 36 has an upwardly concave arcuate bay in which is received a cylindrical sleeve 37 that is secured to each plate, as by welding, to bridge across the plates and cooperate with the hitch brackets 33 in connecting them as a rigid hitch support structure. The axis of the sleeve 37 extends longitudinally, normal to the flat surfaces of the plates 36, and is located at some distance above the level of the hitch brackets 33.

To pivot the hitch support 32 for its tilting motion, its sleeve 37 has a close but freely rotatable fit around a cylindrical bushing 39 that is secured to the fixed support member 11. The rear wall 16 of the support member has an upwardly projecting central portion in which there is a hole 40 wherein a rear end portion of the bushing 39 is received with a close fit, and the front wall 15 of the support member has an arcuate upwardly concave bay 41 in which the bushing is also received. Surrounding the bushing 39 near its front end and secured to it as by welding is a flat flange 42, the surfaces of which are normal to the axis of the bushing. This flange 42 flatwise overlies the front wall 15 of the support member and it is secured to that front wall by means of bolts 43, one at each side of the bushing, which extend through the flange and said front wall. The bolts 43, in cooperation with the flange 42 and the hole 40 in the rear wall of the support member 11, confine the bushing 39 against all movement relative to the support member 11 but provide for ready removal of the bushing for repair or replacement purposes.

The tiltable hitch support 32 is disposed between the front and rear walls 15, 16 of the support member 11, and those walls are cut away at their outer ends, under the holes 18 in which the upper parallelogram linkage pintles 19 are received, to provide clearance for the up and down swinging of the U-channel hitch brackets 33 as the hitch support tilts.

The distance between the outer surfaces of the plates 36 of the hitch support 32 is a little less than the distance between the walls 15, 16 of the support member 11. This leaves clearance for the hitch support to slide forwardly and rearwardly. It always tends to be flatwise engaged with either the front wall 15 or the rear wall 16 of the support member, depending upon the direction in which the tractor is moving, and such engagement reduces fore-and-aft swinging stresses on the sleeve 37. It does not result in undue wear on the engaged flat surfaces because swinging of the hitch support about the longitudinal axis of the bushing 39 is rather slow and of limited extent. For the same reason, no provision need be made for lubricating the trunnion joint betwen the bushing 39 and the sleeve 37.

To coordinate tilting of the hitch support 32 with tilting of the front wheels 8, there is a connection between the hitch support and the link 14 that ties together the wheel brackets 12. That connection comprises a bolt 44 which is surrounded by a spacer sleeve 45 and which extends through the medial portion of the link 14, through an arcuate horizontally elongated clearance hole 47 in the front wall 15 of the support member 11, and through the front plate of the hitch support 32. A nut 48 cooperates with the bolt 44 and the spacer sleeve 45 to so connect the link 14 and the hitch suport 32 that the endwise motion of the link which occurs with swinging of the wheel brackets 12 about the pintles 19 correspondingly rocks the hitch support 32 about the bushing 39.

The link 14 swings in an arc, to have a components of upward motion as the front wheels tilt. However, the radius of that arc, which is equal to the distance between each pintle 19 and its downwardly adjacent pintle 25, is smaller than the distance between the axis of the bushing 39 and the bolt 44. The bolt 44 therefore extends through a hole 64 in the link 14 that is vertically elongated to accomodate that difference in radii.

In addition to providing a trunnion for the hitch support 32, the bushing 39 houses a concentric power take-off shaft 51 that provides for transmission of power from the engine 10 to the mower 9 and to other implements that may be mounted on the tractor. The shaft 51 rotates in ball bearings 52, one near each end of the bushing 39, each received in a counterbore 53 in its end portion of the bushing that defines an axially outwardly facing shoulder. Each bearing 52 is confined against its adjacent shoulder by means of a radially expandable clip ring 54 received in a radially inwardly opening circumferential groove in the bushing near the adjacent end of it. Clip rings 55 received in circumferential grooves in the shaft 51 engage axially opposing faces of the inner races of the bearings 52 to confine the shaft against end play. Because the bushing 39 is secured by means of the bolts 43 in cooperation with the hole 40 in the support member 11, assembly and disassembly of the shaft 51 and its bearings 52 can be accomplished on a bench, away from the tractor.

The power take-off shaft 51 has spline-grooved front and rear portions 56, 57, respectively, that project beyond the bushing 39 to provide for power transmission connections to the shaft. On the front projecting portion 56 of the shaft, closely adjacent to the bushing 39, is mounted a driven pulley 58 that is connected by belts 59 with a driving pulley 60 on the front end portion of the engine crankshaft 10a. Dual belts 59 are used to accommodate the power needed by the large mower. The driving pulley 60 can comprise the output element of a commercially available electric clutch. When that clutch is electrically energized, the pulley 60 is drivingly connected with the engine crankshaft 10a, and otherwise the pulley 60 is braked to provide for quickly stopping the moving parts of the mower 9 or other implement driven from the shaft 51.

The portion of the shaft 51 that projects forwardly beyond the driven pulley 58 is splined or otherwise arranged to provide for detachable connection with a front-mounted implement. The rear portion 57 of the shaft 51 is similarly splined, to provide for detachable connection with the front end of a mower drive shaft 62 that has its rear end connected with the gear box 63 on the mower housing through which the mower blades are driven. The drive shaft 62 comprises front and rear splinedly connected telescoping elements 65, 66, each of which has a universal joint 67, 68, respectively, at its end remote from the other. The rear universal joint 68 has a connection to the mower drive shaft 62 that is not readily detachable, but the front universal joint has a known type of readily detachable connection 69 to the power takeoff shaft 51 to enable quick hitching and unhitching of the mower.

From the foregoing description taken with the accompanying drawings it will be apparent that this invention provides a simple, compact and inexpensive power takeoff shaft arrangement for a tractor having a parallelogram linkage front wheel suspension and a tiltable hitch support for an underslung mower, connectable with a front mounted implement as well as with the mower and also providing a trunnion upon which the mower hitch support is rockable.

What is claimed as the invention is:

1. A tractor having a rigid frame under which a mower can be carried longitudinally intermediate rear driving wheels and steerable front wheels, said tractor comprising an engine mounted on a front portion of said frame, a rigid laterally extending support member near the front end of the frame, laterally opposite wheel supporting brackets, one pivoted to each end portion of said support member to swing about a longitudinally extending upper axis, a laterally extending link pivoted to each of said brackets on a lower axis that is below and parallel to said upper axis to cooperate with the support member in connecting the brackets in a parallelogram linkage, and an axle member for each bracket having a laterally inner portion pivoted to the bracket to swing about a substantially vertical axis and having a laterally outwardly extending axle portion on which a front wheel is rotatable, said tractor being characterized by:
   A. a tubular bushing secured to said support member intermediate the ends thereof with its axis extending longitudinally;
   B. a power takeoff shaft coaxially rotatable in said bushing having opposite end portions that respectively project forward and rearward beyond the bushing;
   C. a laterally extending hitch support having means near its opposite ends for detachable connection to it of forwardly projecting hitch members of a mower;
   D. a sleeve secured to said hitch support intermediate its ends and surrounding said bushing to pivot the hitch support for tilting about the axis of the bushing;
   E. a connection between said link and the hitch support whereby substantially lateral motion of the link imparts tilting motion to the hitch support; and
   F. a driving connection between said engine and one of said end portions of the shaft.

2. The tractor of claim 1, further characterized by:
   (1) said support member being of inverted U-shaped cross-section to have downwardly projecting front and rear walls; and
   (2) said hitch support being disposed between said front and rear walls.

3. The tractor of claim 2, further characterized by:
   (3) one of said walls of the support member having an aperture therein in which one end portion of said bushing is received with a close fit; and
   (4) a flange secured to said bushing near its other end and having surfaces normal to the axis of the bushing, said flange being secured in flatwise overlying relationship to the other of said walls of the support member to secure the bushing thereto.

4. A tractor having a rigid frame under which a mower can be carried longitudinally intermediate rear driving wheels and steerable front wheels, an engine mounted on a front portion of said frame, a rigid laterally extending support member near the front end of the frame, laterally opposite wheel supporting brackets, one pivoted to each end portion of said support member to swing about a longitudinally extending upper axis, a link extending laterally between said brackets and cooperating with said support member to connect the brackets in a parallelogram linkage, said link being pivoted to each of the brackets on a lower axis that is below and parallel to said upper axis, an axle member for each bracket having a laterally inner portion pivoted to the bracket to swing about a substantially vertical axis and having a laterally outwardly extending axle portion on which a front wheel is rotatable, and a laterally extending hitch support having means near its opposite ends for detachable connection thereto of forwardly projecting hitch members of a mower, said tractor being characterized by:
   A. said support member having spaced apart, edgewise upright front and rear walls;
   B. a longitudinally extending tubular bushing
      (1) having one end portion received in a closely fitting hole in one of said walls, intermediate the ends of the support member, and
      (2) having a flange secured to it near its opposite end that has flat surfaces normal to its axis, said flange being secured to the other of said walls in flatwise overlying relationship thereto to cooperate with said hole in fixing the bushing to the support member;
   C. said hitch support
      (1) being disposed between said walls of the support member and
      (2) having a sleeve secured to it intermediate its ends that embraces said bushing and cooperates therewith to support the hitch support for tilting motion about the axis of the bushing;
   D. a connection between said link and the hitch support whereby substantially lateral motion of the link imparts tilting motion to the hitch support;
   E. a power takeoff shaft coaxially rotatable in said bushing having opposite end portions that respectively project forward and rearward beyond the bushing; and
   F. a driving connection between the engine and one of said end portions of the shaft.

* * * * *